United States Patent
Imamura et al.

(10) Patent No.: US 11,233,318 B2
(45) Date of Patent: Jan. 25, 2022

(54) VEHICLE-BODY-EMBEDDED ANTENNA DEVICE

(71) Applicant: HARADA INDUSTRY CO., LTD., Tokyo (JP)

(72) Inventors: Yutaka Imamura, Tokyo (JP); Ryuji Kobayashi, Tokyo (JP); Jun Ishida, Tokyo (JP)

(73) Assignee: HARADA INDUSTRY CO., LTD., Tokyo (JP)

( * ) Notice: Subject to any disclaimer, the term of this patent is extended or adjusted under 35 U.S.C. 154(b) by 40 days.

(21) Appl. No.: 16/639,080

(22) PCT Filed: Aug. 20, 2018

(86) PCT No.: PCT/JP2018/030638
§ 371 (c)(1),
(2) Date: Feb. 13, 2020

(87) PCT Pub. No.: WO2019/073691
PCT Pub. Date: Apr. 18, 2019

(65) Prior Publication Data
US 2020/0212548 A1  Jul. 2, 2020

(30) Foreign Application Priority Data
Oct. 10, 2017  (JP) .............................. JP2017-196594

(51) Int. Cl.
*H01Q 1/32* (2006.01)
*H01Q 5/10* (2015.01)
(Continued)

(52) U.S. Cl.
CPC ........... *H01Q 1/3275* (2013.01); *B60R 11/02* (2013.01); *H01Q 1/22* (2013.01); *H01Q 1/48* (2013.01);
(Continued)

(58) Field of Classification Search
CPC ...................... H01Q 1/32–13275; B60R 11/02
See application file for complete search history.

(56) References Cited

U.S. PATENT DOCUMENTS 6,624,794 B1   9/2003  Wendt et al.
9,666,936 B2 * 5/2017  Hirayama ............ H01Q 1/3275
(Continued)

FOREIGN PATENT DOCUMENTS

GB    2523443 A    8/2015
JP    S63163006 U  10/1988
(Continued)

OTHER PUBLICATIONS

International Search Report in PCT/JP2018/030638 dated Oct. 30, 2018.

*Primary Examiner* — Hasan Islam
(74) *Attorney, Agent, or Firm* — Global IP Counselors, LLP (57) ABSTRACT

A vehicle-body-embedded antenna device includes an antenna element, a circuit board, a coil and a ground bracket. The antenna element of a grounded type has an antenna capacitance adapted to function as a capacitive antenna that supports a first frequency band, and main polarization thereof is polarization substantially parallel to the roof surface. The coil is placed on the circuit board and connected to the power feeding part to which the antenna element is connected for making the antenna element to have an antenna length supporting a second frequency band. The ground bracket is directly grounded to a conductive member of the vehicle body which is provided at an angle different from an angle of the roof surface for improving polarization sensitivity of the antenna element substantially perpendicular to the roof surface.

13 Claims, 4 Drawing Sheets

(51) Int. Cl.
- *H01Q 5/335* (2015.01)
- *B60R 11/02* (2006.01)
- *H01Q 1/22* (2006.01)
- *H01Q 1/48* (2006.01)
- *H01Q 9/04* (2006.01)
- *H01Q 9/40* (2006.01)

(52) U.S. Cl.
CPC ............. *H01Q 5/10* (2015.01); *H01Q 5/335* (2015.01); *H01Q 9/0407* (2013.01); *H01Q 9/40* (2013.01)

(56) References Cited

U.S. PATENT DOCUMENTS

| | | |
|---|---|---|
| 2006/0262018 A1 | 11/2006 | Mikami et al. |
| 2008/0180332 A1* | 7/2008 | Noro ................... H01Q 1/526 343/713 |
| 2014/0062807 A1 | 3/2014 | Hirayama et al. |
| 2015/0357705 A1 | 12/2015 | Ito |
| 2016/0079661 A1 | 3/2016 | Ito et al. |
| 2017/0093027 A1 | 3/2017 | Kondo et al. |
| 2018/0261913 A1* | 9/2018 | Imamura ............. H01Q 1/3275 |

FOREIGN PATENT DOCUMENTS

| | | |
|---|---|---|
| JP | H06152217 A | 5/1994 |
| JP | 2003500871 A | 1/2003 |
| JP | 2003249812 A | 9/2003 |
| JP | 2006352830 A | 12/2006 |
| JP | 2014049993 A | 3/2014 |
| JP | 2014216661 A | 11/2014 |
| JP | 2015133692 A | 7/2015 |
| JP | 2016012915 A | 1/2016 |
| JP | 2017034657 A | 2/2017 |
| JP | 2017061256 A | 3/2017 |

* cited by examiner

VEHICLE TRAVEL DIRECTION

FIG. 6 ardized # VEHICLE-BODY-EMBEDDED ANTENNA DEVICE

CROSS-REFERENCE TO RELATED APPLICATIONS

This application is a U.S. national stage application of International Application No. PCT/JP2018/030638, filed on Aug. 20, 2018, and claims priority to Japanese Patent Application No. 2017-196594 filed on Oct. 10, 2017.

TECHNICAL FIELD

The present invention relates to a vehicle-body-embedded antenna device, and more particularly to an antenna device to be embedded in the roof surface of a vehicle.

BACKGROUND INFORMATION

Antenna devices each of which is mounted on a vehicle and supports multiple frequency bands, covering, e.g., AM/FM bands, include various types such as pillar antennas, roof mount antennas, and glass antennas. Unfortunately, the pillar antenna having a large amount of protrusion is more likely to bend due to contact, etc. The roof mount antenna needs to be tilted flat or removed from the vehicle body in a multilevel parking garage or in an automatic car-wash machine due to be high ground height. Further, the glass antenna could increase the development costs due to requirement of specific, model-based development.

Then, recently, there has been a growing trend to put weight on the vehicle design and therefore, it is required that the antenna devices to be mounted on vehicles do not spoil the appearance of the vehicles as much as possible. In order to meet the requirement, various types of antenna devices that are built in a spoiler have been developed (e.g., Japanese Laid Open Patent Application Publication No. 2014-216661, which is referred to below as Patent Document 1, or Japanese Laid Open Patent Application Publication No. 2016-012915, which is referred to below as Patent Document 2).

SUMMARY

For example, in the case where an antenna device is built in a spoiler, the horizontal polarization characteristic is satisfactory, but the vertical polarization is inferior. Therefore, to cope with such a disadvantage, the antenna device disclosed in, e.g., Patent Document 1 is disposed to set a certain angle toward the vertical direction to the metal body of a vehicle so that the vertical polarization characteristic is improved to a certain extent. Meanwhile, there is a demand for concealment of antenna devices in view of good exterior designs. Unfortunately, where an antenna device is embedded into the roof of a vehicle, the antenna element will be set up parallel to the roof surface of the vehicle and, in that case, the horizontal polarization becomes the main polarization, and hence the antenna device cannot receive vertical polarization components. Therefore, there has been a demand for an antenna device which exhibits superior characteristics of horizontal/vertical polarizations even in a state of being concealed.

In view of the above situation, the present invention has been made and the object thereof is to provide a vehicle-body-embedded antenna device that can be embedded into a vehicle body while improving its horizontal/vertical polarization characteristics.

In order to achieve the above object of the present invention, a vehicle-body-embedded antenna device according to the present invention may comprise: an antenna element of a grounded type, having a flat plate-like portion which is substantially parallel to a roof surface of a vehicle, the antenna element having an antenna capacitance adapted to function as a capacitive antenna that supports a first frequency band, and main polarization of the antenna element being polarization substantially parallel to the roof surface; a circuit board having a power feeding part to which the antenna element is connected; a coil placed on the circuit board and connected to the power feeding part to which the antenna element is connected for making the antenna element to have an antenna length supporting a second frequency band; and a ground bracket serving as a ground of the circuit board, and directly grounded to a conductive member of the vehicle body which is provided at an angle different from an angle of the roof surface for improving polarization sensitivity of the antenna element substantially perpendicular to the roof surface.

Herein, the antenna element may be disposed within a body opening of the vehicle.

Further, the conductive member of the vehicle body, to which the ground bracket is directly grounded, may be a pillar of the vehicle.

Further, the conductive member of the vehicle body, to which the ground bracket is directly grounded, may be a roof frame located adjacent to a pillar of the vehicle.

Further, a position of the roof frame, to which the ground bracket is directly grounded, may be adjacent to the pillar of a front or rear of the vehicle.

Further, the circuit board may be accommodated in a conductive case; and the ground bracket may be formed integrally with the conductive case.

Further, a peripheral edge portion of the antenna element may be spaced apart at a predetermined distance from a peripheral edge portion of the body opening of the vehicle Further, the antenna element may be provided at an inside of the vehicle deeper down from the roof surface shielded by a cover than a thickness range of the cover.

The vehicle-body-embedded antenna device according to the invention may further comprise an amplifier circuit that is placed on the circuit board, and the amplifier circuit may be provided at a location shielded by a portion of the vehicle body at a peripheral edge portion of the roof surface.

The vehicle-body-embedded antenna device according to the present invention may further comprise an amplifier circuit that is placed on the circuit board, and the coil may have a switch capable of varying a length of the coil for making the antenna element to have an antenna length long enough to support other frequency bands in addition to the second frequency band, and the amplifier circuit may be connected to the coil via the switch.

Further, the coil may be placed on the circuit board in such a manner that the antenna element does not lie in its axial direction.

Further, the coil may be provided at a location where neither the ground bracket nor antenna element is provided.

Further, the antenna element and the circuit board may be formed by one printed circuit board.

Further, the coil may be patterned on the one printed circuit board.

The vehicle-body-embedded antenna device according to the present invention is advantageous in that it can be embedded into a vehicle body while improving its horizontal/vertical polarization characteristics.

DETAILED DESCRIPTION OF THE EMBODIMENTS

Figure 1:
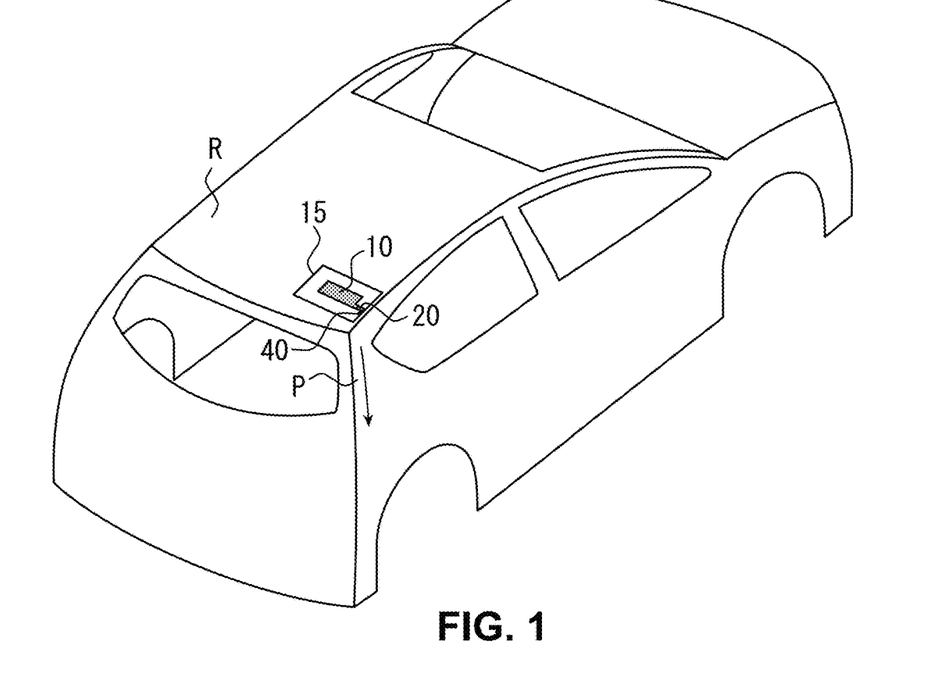
FIG. 1 is a schematic perspective view illustrating a vehicle-body-embedded antenna device according to the present invention.
Figure 2A:
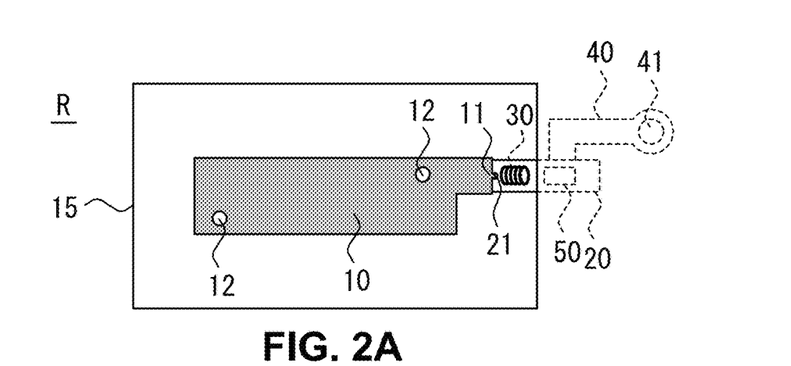
FIGS. 2A and 2B are schematic views for explaining the details of the vehicle-body-embedded antenna device according to the invention.
Figure 2B:
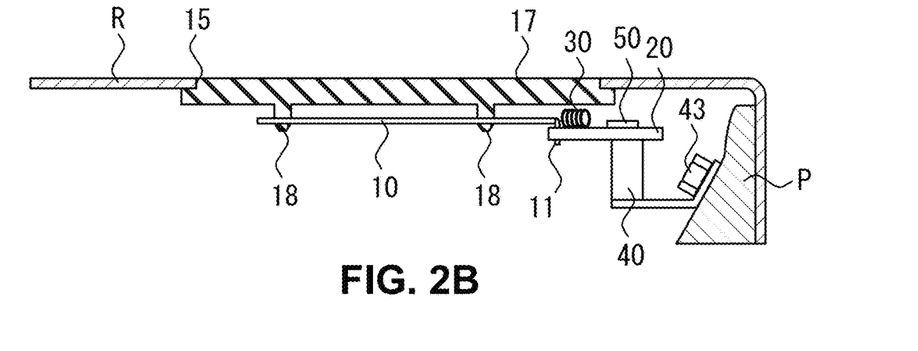

Hereinafter, an embodiment for practicing the present invention will be described with reference to the accompanying drawings. FIG. 1 is a schematic perspective view illustrating a vehicle-body-embedded antenna device according to the present invention. FIG. 2A and FIG. 2B are schematic views for explaining the details of the vehicle-body-embedded antenna device according to the invention, wherein FIG. 2A is a top view and FIG. 2B is a partial cross-sectional side view. In FIG. 2, the same reference numerals as those in FIG. 1 denote the same parts as those in FIG. 1. As illustrated, the vehicle-body-embedded antenna device according to the present invention is mainly constituted by an antenna element 10, a circuit board 20, a coil 30 and a ground bracket 40. As an example, these components are simply required to be embedded in, e.g., a vehicle roof R, or may be incorporated in a spoiler.

The antenna element 10 is configured with a flat plate-like portion extending substantially parallel to the roof surface of a vehicle. Because the antenna element 10 is disposed substantially parallel to the roof surface, the antenna element 10 is an antenna whose main polarization is the polarization substantially parallel to the roof surface. More specifically, when, for example, the antenna element 10 is to be placed on the top roof of a vehicle, its main polarization is horizontal polarization. The antenna element 10 is a grounded antenna having a planar shape and may function like the monopole antenna. According to the illustrated example, the antenna element 10 is provided within a body opening 15 formed on the vehicle roof R. The antenna element 10 has an antenna capacitance that enables itself to operate as a capacitive antenna accommodating a first frequency band. Herein, the first frequency band refers to, e.g., the AM radio band. The antenna element 10 according to the present invention is intended to function as a capacitive antenna; therefore, the area of the antenna element 10 should be determined to have a capacitance large enough to receive the first frequency band on the flat plate-like portion. The antenna element 10 may be formed, for example, through metal plate machining. Specifically, for example, a rectangular flat plate-like portion may be formed in a suitable manner by cutting out a metal plate. The present invention, however, is not limited to this; for example, the antenna element 10 may be formed by processing the conductive film of a printed circuit board or a flexible printed circuit board. Further, the antenna element 10 may be a meander element configured to provide an antenna capacitance substantially equivalent to that of the flat plate-like portion of the antenna element 10 so long as it provides an antenna capacitance enabling it to function as a capacitive antenna which supports the first frequency band. A power feed line 11 is provided to the antenna element 10. The power feed line 11 may be formed as a pin shape processed by bending the edge portion of the flat plate-like portion.

The circuit board 20 has a power feeding part 21 to which the antenna element 10 is connected. That is, the power feed line 11 of the antenna element 10 is connected to the power feeding part 21. The circuit board 20 may be, for example, a common printed circuit board. A coil 30 to be described later, and an amplifier circuit 50 as necessary are mounted on the circuit board 20. Further, the circuit board 20 is connected with a signal cable which is connected to, e.g., a tuner disposed inside a vehicle.

Herein, the antenna element 10 and the circuit board 20 may be formed by one printed circuit board.

The coil 30 is placed on the circuit board 20 and connected to the power feeding part 21 to which the antenna element 10 is connected. The length of the coil 30 is decided so that the antenna element 10 has an antenna length supporting a second frequency band. In other words, the coil 30 is provided for the purpose of compensating the lack of the length of the antenna element 10, so that the antenna element 10 can function as a resonance antenna with respect to the second frequency band. Herein, the second frequency band may be, e.g., the frequency band for FM radio broadcast, DAB (Digital Audio Broadcast) or UHF (Ultra-High Frequency). The coil 30 is series-connected between the antenna element 10 and the amplifier circuit 50. The coil 30 is, for example, a helically wound conducting wire. As illustrated herein, the coil 30 is placed on the circuit board 20 in such a manner that the antenna element 10 lies in its axial direction. Specifically, the coil 30 may be provided in such a way as to be axially parallel to the line connecting between the antenna element 10 and the amplifier circuit 50. The present invention, however, is not limited to the above configuration; the coil 30 may be provided so as to be axially perpendicular to the line connecting between the antenna element 10 and the amplifier circuit 50 so long as the coil length fits within the width of the circuit board 20.

The ground bracket 40 serves as a ground of the circuit board 20. That is, the ground bracket 40 is a part of the ground of the antenna element 10, which is a grounded-type antenna. The ground bracket 40 is directly grounded to a conductive member of the vehicle body which is provided at an angle different from an angle of the roof surface for improving polarization sensitivity of the antenna element 10 substantially perpendicular to the roof surface of a vehicle. For example, in the case where the antenna element 10 is provided in the body opening 15 of the vehicle roof R, the ground bracket may be directly grounded to a pillar P of the vehicle that is to be disposed substantially perpendicularly to the vehicle roof R. Then, where the pillar P is a conductive member, current can be made to flow to the direction of the ground (vertical direction) via the pillar P. Therefore, even with the antenna element 10, which is embedded parallel to the vehicle roof R (horizontal direction) and hence the main polarization of which is horizontal polarization, the structure can obtain vertically polarized waves.

In the vehicle-body-embedded antenna device according to the present invention, current flows in a signal cable connected to the circuit board 20, and therefore could affect the antenna characteristics. In the vehicle-body-embedded antenna device according to the present invention, however, the ground bracket 40 is used for direct grounding to the conductive member provided on the vehicle body, and hence the impact of current on the pillar P is more significant.

There may be occasions when the ground bracket 40 is difficult to directly ground to the pillar P because of, e.g., a problem of layout on the roof. In that case, the ground bracket 40 may be directly grounded to a roof frame of the vehicle that is located adjacent to the pillar. The roof frame herein is a frame, of the vehicle framework (frame), located at a position for supporting the roof. By directly grounding the ground bracket 40 to the roof frame located adjacent to the pillar as the conductive member provided on the vehicle body at an angle different from the angle of the roof surface, nearly the same effect as when the ground bracket 40 is directly grounded to the pillar P can be obtained. The location of the roof frame where the ground bracket 40 is to be directly grounded may be anyplace so long as it is adjacent to the pillar at the front or rear of the vehicle.

Herein, the ground bracket 40 may perform electrical conduction from the circuit board 20 to the pillar P. In the illustrated example, further, the ground bracket 40 is created by bending a conductive plate-like member by way of, e.g., sheet metal processing, and has a predetermined strength, and further has a function as a fixture for fixing the circuit board 20 to the vehicle body. Further, the ground bracket 40 may be bent so as to clamp and be fixed to, the circuit board 20. Further, the ground bracket 40 has a prescribed screw hole 41 so as to be directly grounded to the vehicle body. The vehicle body also has a predetermined screw hole, so that the ground bracket 40 and the vehicle body are tightened together with a bolt 43.

Figure 3A:
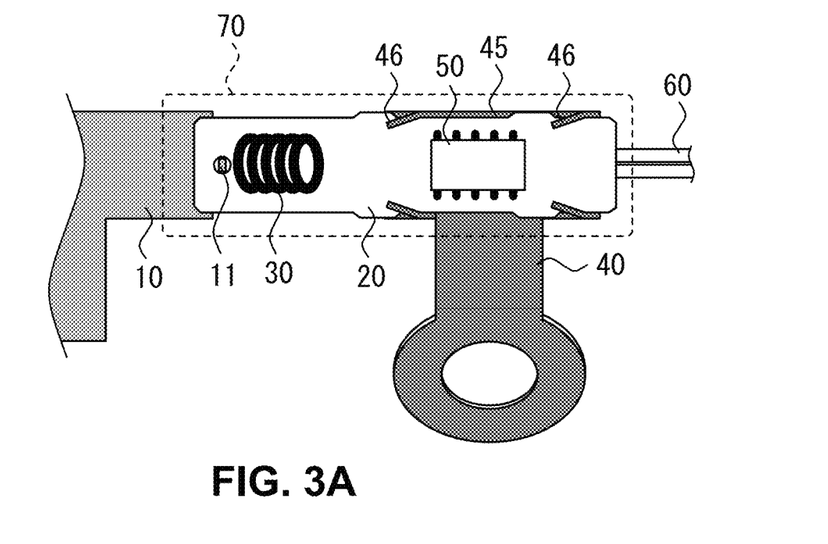
FIGS. 3A and 3B are schematic views for explaining a ground bracket incorporated in the vehicle-body-embedded antenna device according to the invention.
Figure 3B:
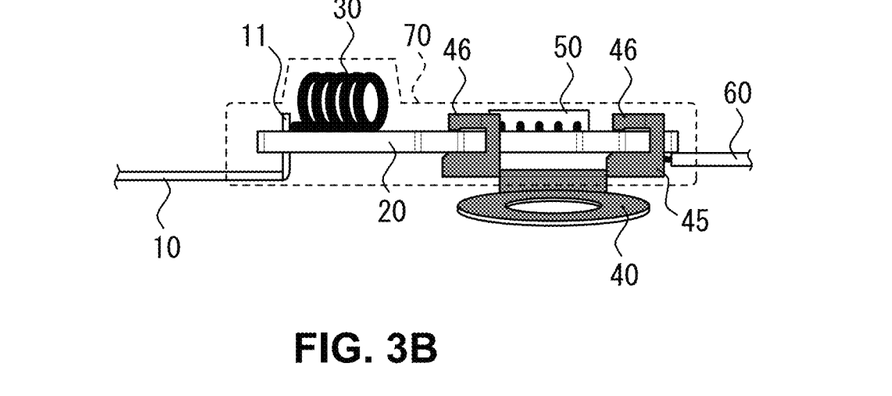

The ground bracket of the vehicle-body-embedded antenna device according to the present invention will be described in more detail with reference to FIG. 3A and FIG. 3B. FIGS. 3A and 3B are schematic views for explaining a ground bracket incorporated in the vehicle-body-embedded antenna device according to the invention, wherein FIG. 3A is a top view and FIG. 3B is a side view. As illustrated, the circuit board 20 is clamped by the ground bracket 40, and thus is configured to be accommodated in a conductive case 45. More specifically, the conductive case 45 is formed by bending a conductive plate-like member into a U-shape by sheet metal processing or the like. In the illustrated example, the ground bracket 40 is formed integrally with the conductive case 45. That is, the ground bracket 40 and the conductive case 45 are formed by bending a single conductive plate-like member by sheet metal processing or the like. The ground bracket 40 and the conductive case 45 may be made as separate components, and then electrically connected with each other. Then, the circuit board 20 is accommodated in the conductive case 45 in such a way that the conductive case 45 clamps the longitudinally opposite ends of the circuit board 20. Claws 46 which fixes the circuit board 20 by bending them toward the upper surface side of the circuit board 20 are provided to upper portions of sidewalls of the conductive case 45. The conductive case 45 is electrically connected to the ground of the circuit board 20 and hence the ground bracket 40 is a ground of the circuit board 20. Also, a signal cable 60 which is connected to a tuner or the like inside the vehicle is connected to the circuit board 20.

As illustrated in FIG. 3A and FIG. 3B, the coil 30 is provided at a location where neither the ground bracket 40 nor the antenna element 10 is placed. Specifically, the coil 30 may be provided, avoiding the location on the circuit board 20 where the ground bracket 40 is fixed or where the antenna element 10 is connected. This configuration makes it possible, by keeping the coil 30 as far away from the conductor that can be the cause of reduction of the Q-factor of the coil 30 as possible, to prevent the performance degradation of the coil 30 as well as reduction of the antenna gain.

Then, the circuit board 20 may be resin molded over its entire circumference region using insulating resin 70. The insulating resin 70 may be a cover configured by a resin case. If the resin case is made of a hard material, the circuit board 20 could be sufficiently protected even when a stress is applied between the ground bracket 40 and the antenna element 10. Additionally, in the case of using packing or performing bonding to hold the circuit board 20 in the resin case or in the case of resin-molding the circuit board 20, the circuit board 20 can be protected from water or the like.

Figure 4A:
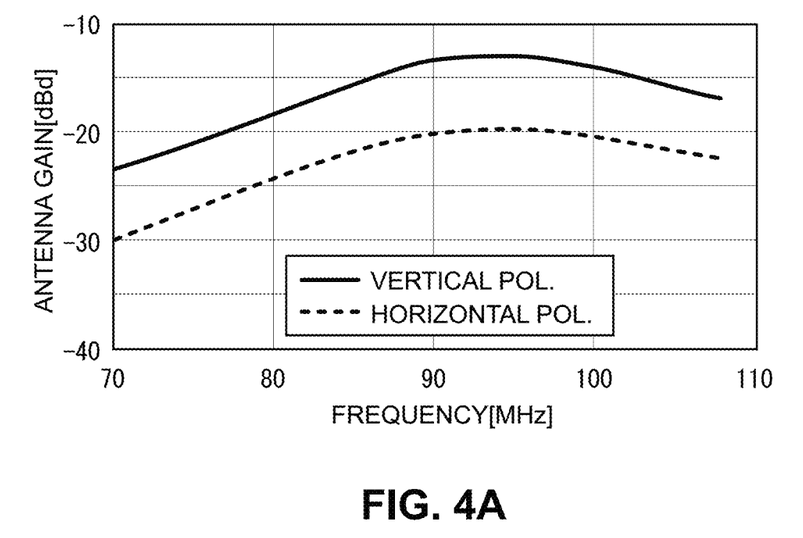
FIGS. 4A and 4B are graphs used to explain antenna gains relative to the frequencies of the vehicle-body-embedded antenna device according to the invention.
Figure 4B:
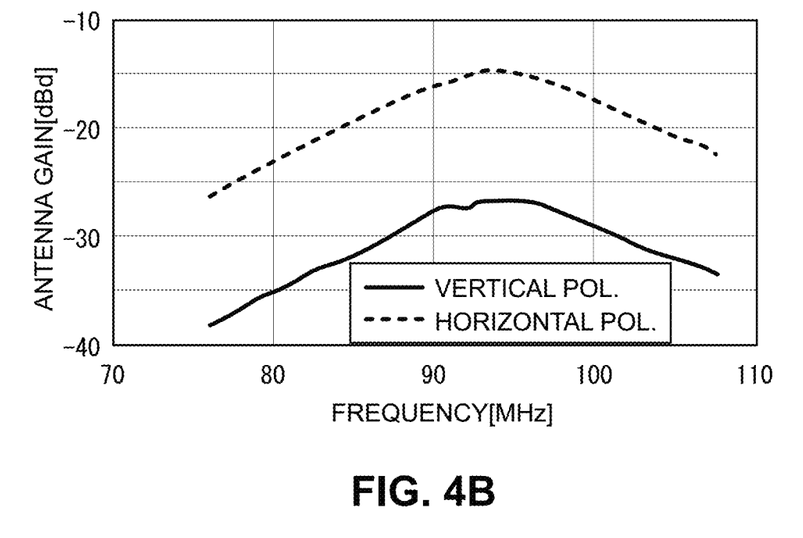

An explanation will now be given of the frequency characteristics of the vehicle-body-embedded antenna device, using FIG. 4A and FIG. 4B. FIGS. 4A and 4B are graphs used to explain antenna gains relative to the frequencies of the vehicle-body-embedded antenna device according to the invention, wherein FIG. 4A is the result of simulation according to the present invention, and FIG. 4B is the result of simulation according to a comparative example. The comparative example is from a structure where the antenna device is grounded to a tuner side by way of a coaxial cable, unlike where the antenna device is directly grounded to the pillar like the present invention. As can be understood from the graphs, in the comparative example, the horizontal polarization is the main polarization, while the gain characteristics of the vertical polarization are improved in the present invention. In the illustrated example, hence, the gains of the vertical polarization have been improved. In this way, the vehicle-body-embedded antenna device according to the present invention can be embedded in a vehicle body while improving horizontal/vertical polarization characteristics.

Referring to FIG. 2A again herein, as can been seen, a peripheral edge portion of the antenna element 10 of the vehicle-body-embedded antenna device according to the present invention is spaced apart at a predetermined distance from a peripheral edge portion of the body opening 15 of the vehicle. This is for preventing capacitive coupling between the antenna element 10 and the vehicle body made of a conductive material. This predetermined distance may be large enough to ignore antenna performance degradation due to capacitive coupling. Additionally, if the vehicle roof R is made of resin or glass rather than a conductive material, the body opening need not be provided as a matter of course.

Further, as illustrated in FIG. 2A, the amplifier circuit 50 of the circuit board 20 may be provided at a position shielded by the vehicle body at a peripheral edge portion of the roof surface. In other words, a requirement for exposure from the body opening 15 is only directed to the antenna element 10 and the coil 30, and the amplifier circuit 50 may be hidden behind the vehicle body at the peripheral edge portion of the roof surface (an end portion of the roof). If the vehicle roof R is a conductive member, a shield effect for the amplifier circuit 50 can be obtained.

Further, referring back to FIG. 2B, as can be seen, the antenna element 10 of the vehicle-body-embedded antenna device according to the present invention may be placed at the inside of the vehicle deep down from the roof surface.

The body opening 15 formed on the vehicle is covered by a cover 17. The cover 17 may be made of, e.g., resin, glass or carbon. Since the body opening 15 is covered by the cover 17, the antenna element 10 is provided at the inside of the vehicle deeper down than the thickness range of the cover 17. Herein, the antenna element 10 has, e.g., clip holes 12, so that it may be fixed by clips 18 formed on the cover 17. The vehicle-body-embedded antenna device according to the present invention can exhibit a sufficient signal reception performance even where the antenna element is positioned lower than the roof surface. Further, since the coil 30 and the antenna circuit 50 are placed on the roof-side surface of the circuit board 20 and the ground bracket 40 is provided on the rear surface of the circuit board 20, a shield effect can be made against noise emitted from electronic components themselves as well as noise emitted from inside the vehicle.

Figure 5:
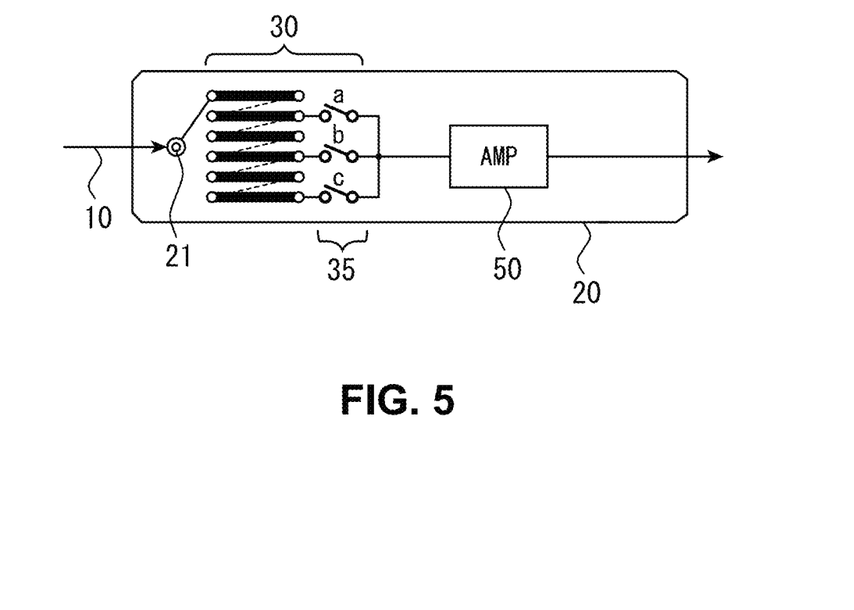
FIG. 5 is a schematic plan view of a circuit board incorporated in the vehicle-body-embedded antenna device according to the invention, illustrating another example of a coil adaptable to the antenna device according to the invention.

Further, the vehicle-body-embedded antenna device according to the present invention can be made as a multi-band antenna by providing the antenna element with an antenna length long enough to support multiple frequency bands in addition to the second frequency band. FIG. 5 is a schematic plan view of a circuit board incorporated in the vehicle-body-embedded antenna device according to the invention, illustrating another example of a coil adaptable to the antenna device according to the invention. In FIG. 5, the same reference numerals as those in FIGS. 1 to 3B denote the same parts as those in FIGS. 1 to 3B. As illustrated, for example, the coil 30 may be formed as a helical pattern made by front and rear patterns connected by through holes on the circuit board 20 constituted by a double-side board. Then, a switch 35 is provided to the coil 30. The switch 35 is adapted to make the length of the coil 30 variable. The amplifier circuit 50 is connected to the coil 30 via the switch 35. Specifically, the switch 35 is connected to the predetermined through holes of the coil 30. In the illustrated example, three switch elements 35a to 35c are connected respectively to the predetermined through holes. Controlling the switch 35 allows the antenna element 10 to have an antenna length that can support other frequency bands in addition to the second frequency band. In the illustrated example, the coil 30 is disposed such that the axial direction of the coil 30 is perpendicular to the line connecting between the antenna element 10 and the amplifier circuit 50. This arrangement achieves an efficient layout of the coil 30 and switch 35 between the antenna element 10 and the amplifier circuit 50. With the above configuration, the illustrated vehicle-body-embedded antenna device can make a multiband antenna device. In more detail, when, for example, the switch element 35c is turned ON and the switch elements 35a and 35b are turned OFF, the coil 30 becomes longest, and the total sum of the lengths of the antenna element 10 and the coil 30 at this time is designed to support the second frequency band. Then, when, for example, the switch element 35b is turned ON and the switch elements 35a and 35c are turned OFF, the coil 30 becomes shorter than when the switch element 35c is turned ON. This indicates that the antenna length can support a higher frequency band than the second frequency band. In addition, when, for example, the switch element 35a is turned ON and the switch elements 35b and 35c are turned OFF, the coil 30 becomes even shorter. This indicates that this antenna length can support even a higher frequency band. Hence, the vehicle-body-embedded antenna device according to the present invention which is configured to make the length of the coil 30 variable can be a multiband antenna device.

Herein, when, as illustrated in FIG. 5, the coil 30 is constituted by the pattern on the circuit board 20, the antenna element 10 and the coil 30 can be formed by patterning on one printed circuit board.

Figure 6:
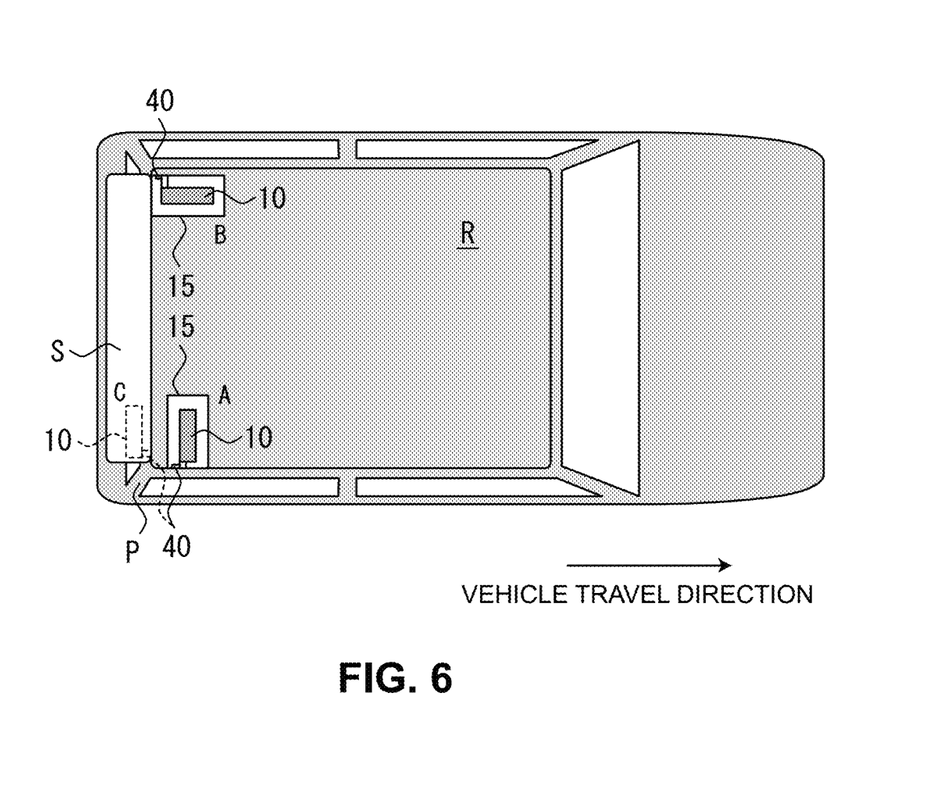
FIG. 6 is a schematic top view of a vehicle, illustrating layout examples of the vehicle-body-embedded antenna device according to the invention.

Next, layout examples of the vehicle-body-embedded antenna device according to the present invention are explained with reference to FIG. 6. FIG. 6 is a schematic top view of a vehicle, used to explain layout examples of the vehicle-body-embedded antenna device. Three layout examples A, B and C are shown in FIG. 6. The layout example A is, as illustrated in FIG. 1, an example where the antenna element 10 is provided with its longitudinal direction perpendicular to the travel direction of the vehicle. The body opening 15 is formed at a rear end part of the vehicle roof R and is rectangular elongated in the direction perpendicular to the travel direction of the vehicle. Within the body opening 15, the antenna element 10 is provided with its longitudinal direction perpendicular to the travel direction of the vehicle. The antenna element 10, which is disposed parallel to the roof surface, is directly grounded via the ground bracket 40 to the pillar angled differently from the roof surface. The layout example B is an example where the antenna element 10 is provided with its longitudinal direction parallel to the travel direction of the vehicle. The body opening 15 is formed at a rear end part of the vehicle roof R and is rectangular elongated in the direction parallel to the travel direction of the vehicle. Within the body opening 15, the antenna element 10 is provided with its longitudinal direction parallel to the travel direction of the vehicle. The antenna element 10, which is disposed parallel to the roof surface, is directly grounded via the ground bracket 40 to the pillar angled differently from the roof surface. As understood, in the vehicle-body-embedded antenna device according to the present invention, the antenna element 10 may be provided with its longitudinal direction either perpendicular or parallel to the travel direction of the vehicle. The vehicle-body-embedded antenna device according to the present invention, when provided on the vehicle roof, is preferably located as close to the pillar or the like provided at an angle different from that of the roof surface as possible and directly grounded via the ground bracket.

The vehicle-body-embedded antenna device according to the preset invention can improve the polarization sensitivity of the antenna element 10 substantially perpendicular to the roof surface of the vehicle, by directly grounding the antenna element 10 having a flat plate-like portion extending substantially parallel to the roof surface of the vehicle, via the ground bracket 40, to the conductive member provided on the vehicle body at an angle different from the angle of the roof surface. Hence, the antenna element 10 need not always be placed within the body opening so long as it is provided substantially parallel to the roof surface. For example, the layout example C illustrated in FIG. 6 is an example where the antenna element 10 is provided within a spoiler S. To be more specific, the spoiler S is, e.g., a rear spoiler. Within the spoiler S, the antenna element 10 is provided with its longitudinal direction perpendicular to the travel direction of the vehicle. Further, the antenna element 10, which is disposed parallel to the roof surface, is directly grounded via the ground bracket 40 to the pillar angled differently from the roof surface. As can be understood from the above examples, in the vehicle-body-embedded antenna device according to the present invention, the layout of its antenna element can be adjusted according to each vehicle type. Any of the above-described layout examples can achieve the improvement of horizontal/vertical polarization characteristics.

The vehicle-body-embedded antenna device according to the present invention is not limited to the above illustrative examples but may be variously modified without departing from the scope of the present invention.

The invention claimed is:

1. A vehicle-body-embedded antenna device to be embedded in a vehicle body, the vehicle-body-embedded antenna device comprising:
a grounded antenna element having a flat plate which is substantially parallel to a roof surface of a vehicle, the grounded antenna element having an antenna capacitance adapted to function as a capacitive antenna that supports a first frequency band, and a main polarization of the grounded antenna element being substantially parallel to the roof surface;
a circuit board having a power feeding part to which the grounded antenna element is connected;
a coil placed on the circuit board and connected to the power feeding part to which the grounded antenna element is connected for making the grounded antenna element to have an antenna length supporting a second frequency band; and
a ground bracket serving as a ground of the circuit board, and directly grounded to a pillar of the vehicle body which is provided at an angle different from an angle of the roof surface for improving sensitivity of a substantially perpendicular polarization of the grounded antenna element, the substantially perpendicular polarization being substantially perpendicular to the roof surface.

2. The vehicle-body-embedded antenna device according to claim 1, wherein the circuit board is accommodated in a conductive case; and
the ground bracket is formed integrally with the conductive case.

3. The vehicle-body-embedded antenna device according to claim 1, wherein the grounded antenna element is provided at an inside of the vehicle deeper down from the roof surface shielded by a cover than a thickness range of the cover.

4. The vehicle-body-embedded antenna device according to claim 1, which further comprises:
an amplifier circuit that is placed on the circuit board,
wherein the amplifier circuit is provided at a location shielded by a portion of the vehicle body at a peripheral edge portion of the roof surface.

5. The vehicle-body-embedded antenna device according to claim 1, which further comprises:
an amplifier circuit that is placed on the circuit board,
wherein the coil has a switch capable of varying a length of the coil for making the grounded antenna element to have an antenna length long enough to support other frequency bands in addition to the second frequency band, and
the amplifier circuit is connected to the coil via the switch.

6. The vehicle-body-embedded antenna device according to claim 1, wherein the coil is placed on the circuit board in such a manner that the grounded antenna element does not lie in its axial direction.

7. The vehicle-body-embedded antenna device according to claim 1, wherein the coil is provided at a location where neither the ground bracket nor the grounded antenna element is provided.

8. The vehicle-body-embedded antenna device according to claim 1, wherein the grounded antenna element and the circuit board are formed by one printed circuit board.

9. The vehicle-body-embedded antenna device according to claim 8, wherein the coil is patterned on the one printed circuit board.

10. A vehicle-body-embedded antenna device to be embedded in a vehicle body, the vehicle-body-embedded antenna device comprising:
a grounded antenna element having a flat plate which is substantially parallel to a roof surface of a vehicle and disposed within a body opening of the vehicle, the grounded antenna element having an antenna capacitance adapted to function as a capacitive antenna that supports a first frequency band, and a main polarization of the grounded antenna element being substantially parallel to the roof surface;
a circuit board having a power feeding part to which the grounded antenna element is connected;
a coil placed on the circuit board and connected to the power feeding part to which the grounded antenna element is connected for making the grounded antenna element to have an antenna length supporting a second frequency band; and
a ground bracket serving as a ground of the circuit board, and directly grounded to a pillar of the vehicle body which is provided at an angle different from an angle of the roof surface for improving sensitivity of a substantially perpendicular polarization of the grounded antenna element, the substantially perpendicular polarization being substantially perpendicular to the roof surface.

11. The vehicle-body-embedded antenna device according to claim 10, wherein a peripheral edge portion of the grounded antenna element is spaced apart at a predetermined distance from a peripheral edge portion of the body opening of the vehicle.

12. A vehicle-body-embedded antenna device to be embedded in a vehicle body, the vehicle-body-embedded antenna device comprising:
a grounded antenna element having a flat plate which is substantially parallel to a roof surface of a vehicle, the grounded antenna element having an antenna capacitance adapted to function as a capacitive antenna that supports a first frequency band, and a main polarization of the grounded antenna element being substantially parallel to the roof surface;
a circuit board having a power feeding part to which the grounded antenna element is connected;
a coil placed on the circuit board and connected to the power feeding part to which the grounded antenna element is connected for making the grounded antenna element to have an antenna length supporting a second frequency band; and
a ground bracket serving as a ground of the circuit board, and directly grounded to a roof frame which is located adjacent to a pillar of the vehicle body and which is provided at an angle different from an angle of the roof surface for improving sensitivity of a substantially perpendicular polarization of the grounded antenna element, the substantially perpendicular polarization being substantially perpendicular to the roof surface.

13. The vehicle-body-embedded antenna device according to claim 12, wherein a position of the roof frame, to which the ground bracket is directly grounded, is adjacent to the pillar of a front or rear of the vehicle.

* * * * *